United States Patent

Veugen et al.

[11] Patent Number: 5,908,466
[45] Date of Patent: *Jun. 1, 1999

[54] METHOD OF DETERMINING A DIRECTIONAL CHANGE DURING VEHICLE NAVIGATION, APPARATUS FOR CARRYING OUT SUCH A METHOD, AND VEHICLE COMPRISING SUCH AN APPARATUS

[75] Inventors: Leonardus M. M. Veugen; Hans G. M. Hermans; Antoon M. M. Van Kessel, all of Eindhoven, Netherlands

[73] Assignee: Mannesman VDO Ag, Frankfurt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/494,532

[22] Filed: Jun. 28, 1995

[30] Foreign Application Priority Data

Jul. 4, 1994 [EP] European Pat. Off. ............ 94201915

[51] Int. Cl.$^6$ ..................................................... G01C 17/00
[52] U.S. Cl. ........................... 701/224; 701/221; 702/93; 318/587
[58] Field of Search .................................... 364/457, 450, 364/453, 449, 551.01, 559, 561, 565, 571.01; 340/988; 303/168, 174; 701/224, 217, 220, 207; 702/92, 93

[56] References Cited

U.S. PATENT DOCUMENTS

| 4,032,758 | 6/1977 | Lewis | 364/457 |
| 4,663,719 | 5/1987 | Matsumoto et al. | 364/444 |
| 4,791,574 | 12/1988 | Thoone et al. | 364/457 |
| 5,040,122 | 8/1991 | Neukirchner et al. | 364/449 |
| 5,307,728 | 5/1994 | Baur et al. | 91/31 |
| 5,317,515 | 5/1994 | Matsuzaki | 364/454 |
| 5,402,365 | 3/1995 | Kozikaro et al. | 364/571.01 |
| 5,487,009 | 1/1996 | Hill | 364/449 |

FOREIGN PATENT DOCUMENTS 09208953  5/1992  WIPO .

*Primary Examiner*—Tan Q. Nguyen
*Attorney, Agent, or Firm*—Mayer Brown & Platt

[57] ABSTRACT

A method of determining a directional change of a vehicle carries out dead-reckoning for which it utilizes sensors provided on two wheels. In order to compensate for differences between the wheels, the method utilizes given parameters in processing the data from the wheel sensors. The invention provides an extension of the method by estimating the parameters during normal operation of the vehicle, so that they are adapted to changing circumstances encountered by the vehicle. Estimation is performed by comparing data from the wheel sensors with independently determined directional data for a given period of time.

16 Claims, 3 Drawing Sheets

METHOD OF DETERMINING A DIRECTIONAL CHANGE DURING VEHICLE NAVIGATION, APPARATUS FOR CARRYING OUT SUCH A METHOD, AND VEHICLE COMPRISING SUCH AN APPARATUS

BACKGROUND OF THE INVENTION

The invention relates to a method of determining a directional change during navigation, comprising a left wheel sensor and a right wheel sensor, each of which is operative to supply pulses which are a measure of excursion of an associated wheel, which method comprises the following steps for a sampling interval:

recording a number of pulses pL from the left wheel sensor and a number of pulses pR from the right wheel sensor, supplying a left correction factor ratioL and a right correction factor ratioR, determining the directional change from (ratioL×pL−ratioR×pR).

The invention also relates to an apparatus for determining directional changes, comprising a left input for receiving a signal pL which is representative of the number of left pulses, a right input for receiving a signal pR which is representative of the number of right pulses, storage means for storing a left correction factor ratioL and a right correction factor ratioR, arithmetic means which are coupled to the left input, the right input and the storage means in order to calculate (ratioL×pL−ratioR×pR).

The invention also relates to a vehicle provided with such an apparatus.

A method of this kind forms a part of the determination of the position of a vehicle on a dead-reckoning basis. During the determination of the position of a vehicle on the basis of dead-reckoning, a next position is determined on the basis of the position of a vehicle at a given instant and the data acquired from vehicle sensors. Such a method of determining directional changes of a vehicle is known from U.S. Pat. No. 4,791,574 (PHN 11.122). The cited Patent relates to the determination of a directional change on the basis of data from two independent sources, i.e. from wheel sensors and from a compass sensor. The combination of data from the two sources results in improved determination of the directional change.

Such a method is also known from U.S. Pat. No. 5,307,278 (PHN 13.395) in which a calculated position, determined on the basis of a directional change obtained from the wheel sensors, is compared with feasible positions determined on the basis of data from a cartographic data base. If the calculated position deviates from a position determined from the route followed and by means of the cartographic data, the calculated position is corrected and the corrected position is subsequently used for a next position calculation.

The cited Patent Specifications utilize a directional change calculated from the wheel sensor data so as to determine a next position of the vehicle. This is done by determining the path travelled by each of the wheels, followed by calculation of the directional change from the difference. It has been found in practice that this method of determining a directional change is insufficiently accurate. Because the inaccuracies accumulate, in the course of time an unacceptable error occurs in the direction thus determined, even when the deviations per individual step are small. Inaccuracies may be due to, for example wear of the tyres, loading of the vehicle and other changing circumstances. In systems which combine a directional change calculated from the wheel sensor data with data acquired in another manner, as in the cited Patent Specifications, there is also a need to enhance the accuracy.

SUMMARY OF THE INVENTION

It is an object of the invention to provide a method which determines the directional change of a vehicle from data from wheel sensors, in which the accuracy of the determination of the directional change is enhanced by adaptation, during operation, of the determination to possibly changing circumstances experienced by the vehicle.

To this end, in accordance with the method of the invention:

the above steps are executed, during operation of the vehicle and during a number of sampling intervals, for each sampling interval there being collected values for pL and pR and a directional change being independently determined, and by comparison of the values collected for pL and pR and the independently determined directional changes, for further use a first estimate is made for the left correction factor and a second estimate is made for the right correction factor.

The determination per se is improved by comparing, at regular instants during normal operation, the wheel sensor data with the directional change determined by means of data from an independent source. If necessary, parameters involved in the determination are adapted, resulting in more accurate determination at subsequent instants.

A version of the method of the invention is characterized in that the independent determination of the directional change is performed while utilizing a compass sensor. The use of a compass sensor in conjunction with wheel sensors is known per se, for example from the cited U.S. Pat. No. 4,791,574. In this version of the method of the invention, however, the data of the compass sensor is also used to improve the determination of the directional change from the wheel sensor by calibration of parameters involved in this determination.

A version of the method of the invention is characterized in that the acquisition of the values is interrupted if a number of conditions in respect of speed and direction of travel of the vehicle, operation of the wheel sensors and operation of the compass sensor is not satisfied. According to this version it is ensured that reliable data is used for estimating the parameters. This prevents the estimate from being made on the basis of incidentally incorrect data, for example as caused by slipping wheels.

A version of the method of the invention is characterized in that the independent determination of the directional changes is performed while utilizing cartographic data. The use of cartographic data in conjunction with wheel sensors is known per se, for example from the cited U.S. Pat. No. 5,307,278. In this version of the method of the invention, however, the cartographic data is also used to improve the determination of the directional change from the wheel sensor data by calibration of parameters involved in this determination. Furthermore, a version of a method of the invention can utilize compass data as well as cartographic data in order to improve the determination. A particularly important advantage of the combination of the two possibilities resides in the complementary nature of the two kinds of data: in given environments, such as in a city, the data of the compass sensor is unreliable rather often whereas the cartographic data is very suitable; in other environments, such as on highways, the reverse situation occurs.

A version of the method of the invention is characterized in that the first estimate and the second estimate are converted, via a low-pass filter, into a third estimate and a fourth estimate, respectively, the third estimate and the fourth estimate being used to determine the directional change. The value of the parameters are of major importance for the determination of the directional change, so they should not fluctuate too much. Therefore, according to this version the estimates of the parameters are filtered by a low-pass filter, so that sudden changes are subdued.

The apparatus in accordance with the invention is characterized in that it comprises:

- a further input for receiving information relating to a series of directional changes,
- further arithmetic means for associating the series of directional changes with series of left pulses and right pulses in order to make a first estimate of the left correction factor and a second estimate of the right correction factor.

The apparatus can thus estimate parameters on the basis of wheel sensor data and independent information concerning directional changes, which parameters subsequently enable improved determination of the directional changes.

An embodiment of the apparatus in accordance with the invention is characterized in that the apparatus comprises a low-pass filter which is connected to the further arithmetic means in order to convert the first estimate and the second estimate into a third estimate and a fourth estimate, respectively. The low-pass filter subdues any sudden variations in the parameters in order to prevent unstable behaviour of the apparatus.

An embodiment of the vehicle in accordance with the invention comprises an apparatus which carries out the method of the invention and which cooperates with a navigation system in the vehicle. The data delivered to the navigation system by the apparatus is continuously adapted, by way of the method of the invention, to the possibly changing circumstances experienced by the vehicle. High-quality data is thus obtained, enabling more accurate operation of the navigation system.

BRIEF DESCRIPTION OF THE DRAWINGS

The invention will be described in detail hereinafter, by way of example, with reference to the drawing; therein.

DETAILED DESCRIPTION OF THE PREFERRED EMBODIMENTS

Figure 1:
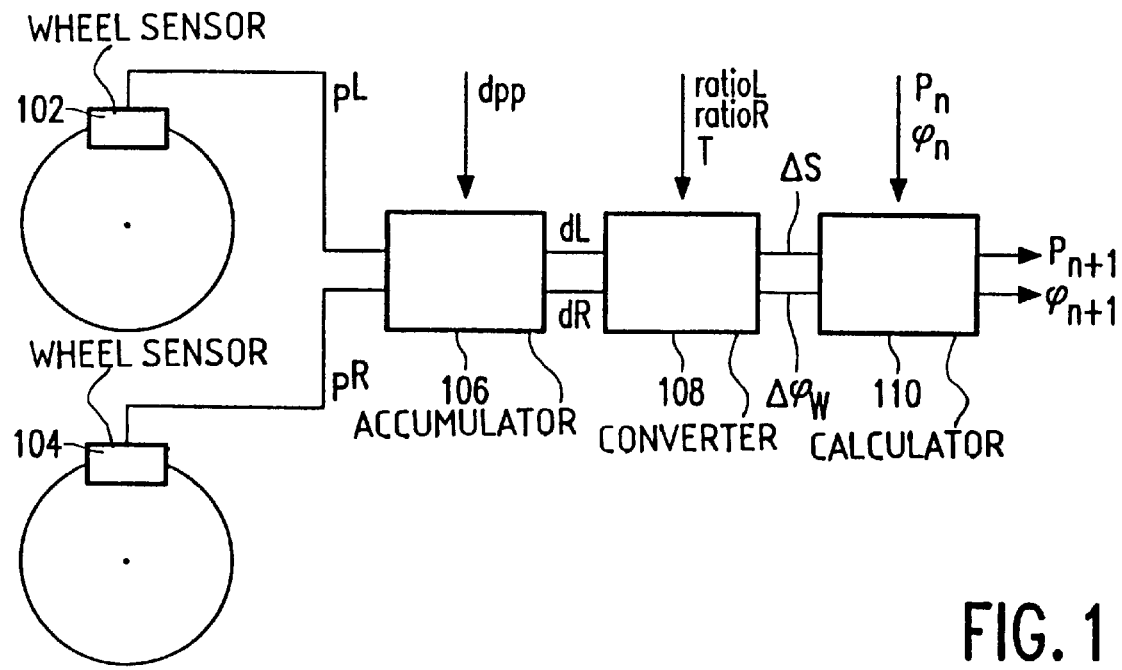
FIG. 1 is a diagrammatic representation of a system for application of a dead-reckoning method.

Corresponding reference numerals in the drawing denote similar elements.

FIG. 1 is a diagrammatic representation of a system for carrying out a method in which the position is determined by way of dead-reckoning utilizing exclusively data from wheel sensors. In practice such a system is extended with supplementary data, such as the directional data determined by means of a compass. This practical extension, however, is not important to the application of the invention and has been omitted for the sake of simplicity of the explanation. According to the method of FIG. 1, vehicle data is collected during a so-called sampling interval, i.e. wheel sensor data in the present case. This data is used to calculate, starting from a vehicle position $P_n$ and a vehicle direction $\phi_n$ at the beginning of the interval, a position $P_{n+1}$ and a direction $\phi_{n+1}$ at the end of the interval. The present example includes a wheel sensor 102 which supplies pulses pL and a right wheel sensor 104 which supplies pulses pR, the pulses corresponding to an excursion of the respective wheels. The pulses are accumulated in a unit 106 during the interval, after which they are converted into a distance dL travelled by the left wheel during the interval and a distance dR travelled by the right wheel during the interval, respectively, in conformity with the formules:

$$dL = dpp \times pL \quad (1)$$

and $$dR = dpp \times pR \quad (2)$$

Therein, dpp is the distance travelled per pulse from the wheel sensor.

Subsequently, in a unit 108 the distances thus determined are converted into a mean path $\Delta s$ travelled by the vehicle during the sampling interval in conformity with:

$$\Delta s = \frac{ratioL \times dL + ratioR \times dR}{2} \quad (3)$$

Therein, ratioL and ratioR are correction factors which compensate for the effect of a difference, if any, between the left wheel and the right wheel. Furthermore, the unit 108 calculates the directional change $\Delta\phi_w$ of the vehicle during the interval in conformity with:

$$\Delta\varphi_w = \frac{ratioL \times dL - ratioR \times dR}{T} \quad (4)$$

Therein, T is the distance between the two wheels with the sensors. If the sensors are mounted on the front wheels, T is subject to a correction which is dependent on the steering deflection. Finally, on the basis of a position $P_n$ and a direction $\phi_n$, a unit 110 calculates a next position $P_{n+1}$ and a next direction $\phi_{n+1}$. The direction is determined simply from:

$$\phi_{n+1} = \phi_n + \Delta\phi_w \quad (5)$$

It appears from the foregoing that an error in the determination of the directional change $\Delta\phi_w$ has a cumulative effect in the determination of the direction. In each sampling interval the error is processed again, so that in the course of time an unacceptable error occurs in the direction determined even if the error in each individual determination is small. The position calculated in conformity with the method, therefore, does not correspond to the actual position of the vehicle. It has been found in practice, for example that after a distance travelled of 5.5 km, the position calculated by the method may have a transverse deviation of 3.5 km with respect to the actually travelled path. This means that a method of this kind could be used for short distances only. As has already been stated, in practice the described method is used in combination with another method of position determination. An example thereof is the combination of the method with an electronic map, in which case it is checked whether the calculated position corresponds to a feasible position on the map. At suitable instants, for example when the vehicle turns off to a sideroad, the calculated position is reset to the correct position in conformity with the map. For this combination of methods it is again very important that the dead-reckoning determination is as accurate as possible so as to enable as reliably as possible determination of the position on the map.

Figure 2:
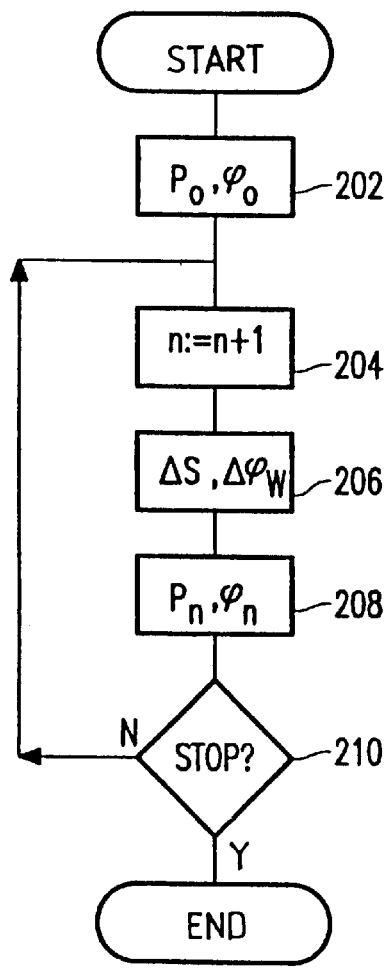
FIG. 2 shows a flowchart illustrating the dead-reckoning method.

FIG. 2 is a simplified flowchart of the execution of a dead-reckoning method. The starting position of the vehicle is determined in an initial step 202. This position can be entered by the user, for example in the form of a set of coordinates or a map position, but it may also be the last position calculated during previous use, which position has been saved in a memory for this purpose. Another possibility consists in that the starting position is determined by an independent system capable of determining an absolute position of the vehicle. This is, for example a system which finds direction by means of radio beacons in known positions, or a system capable of receiving signals from special navigation satellites. After the starting position has been determined, data is received from sensors of the vehicle during a sampling interval; this interval is symbolized by step 204. Subsequently, in step 206 this data is processed so as to obtain the path travelled and the directional change during the interval in accordance with the formulae 3 and 4. Subsequently, in step 208 the position and direction of the vehicle at the end of the interval are calculated from the distance travelled and the directional change. Finally, in step 210 it is checked whether a next sampling interval should commence or whether the method should be stopped. During normal operation, each time a new interval will commence as denoted by the return to the step 204 in FIG. 2. Stopping will take place, for example at the end of a ride.

Figure 3:
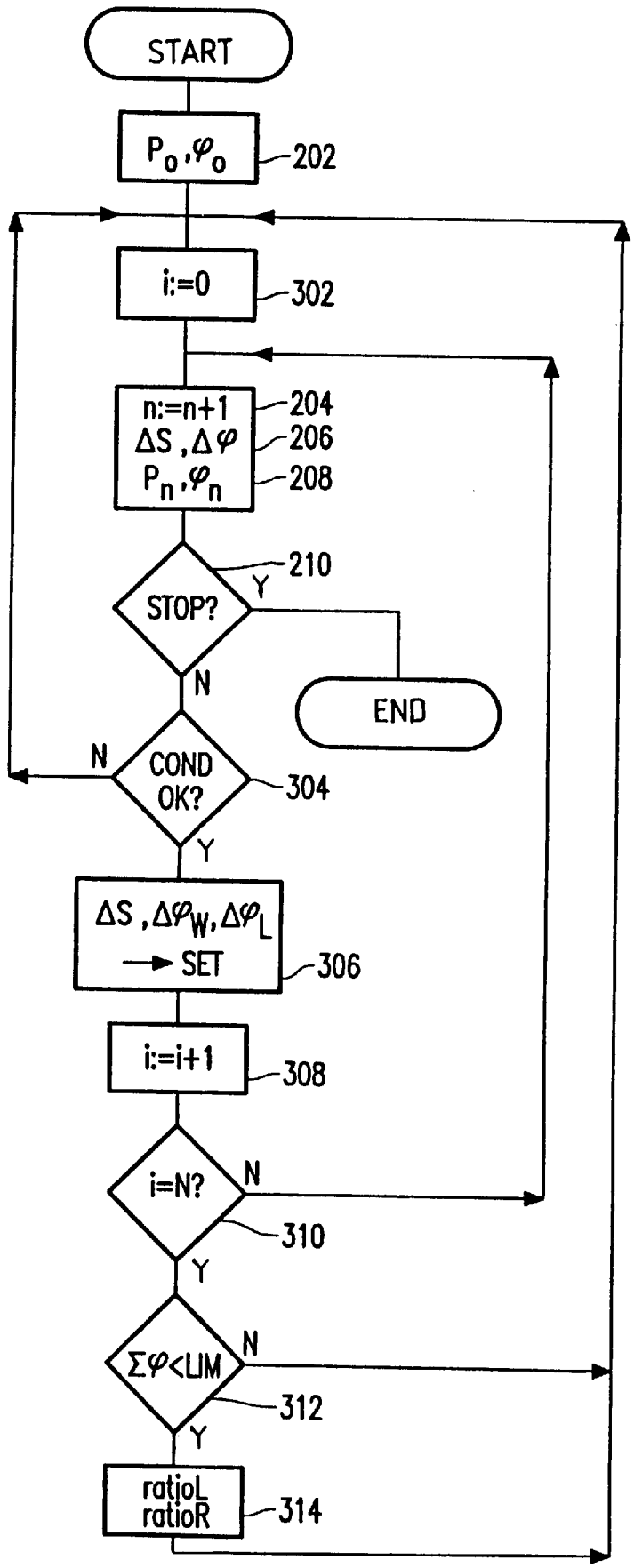
FIG. 3 illustrates the invention as used in the method shown in FIG. 2.

FIG. 3 shows the use of the invention for the method described above. According to this application, the reception of sensor data during a sampling interval and the calculation of a next position, symbolized by the cycle of steps 204, 206, 208 and 210, is supplemented by the possibility of estimating new values for the parameters ratioL and ratioR used in the step 206. For this purpose an additional, independent possibility of determining the direction of the vehicle is used, for example a compass sensor. The use of the invention comes down to the execution of estimation cycles, each of which comprises:

saving data from the wheel sensors and the compass sensor for a number of sampling intervals, and calculating a value for the parameters ratioL and ratioR from this data.

In step 302 a counter i, counting the number of sampling intervals for which a set of sensor data has been collected, is set to zero so as to commence an estimation cycle. After a sampling interval has elapsed, it is checked in step 304 whether a number of conditions for continuing the estimation cycle has been satisfied. In a given embodiment of a system utilizing the invention it is a prerequisite that each of the following conditions is satisfied during the relevant interval:

the vehicle moves forward, the speed of the vehicle is at least 8 m/s, the wheels do not slip, the vehicle is not rounding a curve, the compass data is reliable, the compass is not being calibrated.

If the relevant conditions of the step 304 are satisfied, in step 306 a set of sensor data concerning this interval is added to the set of data already collected. If not all relevant conditions are satisfied, the data is not saved and, moreover, an already collected set, if any, is removed by returning to the step 302. In addition to $\Delta s$ and $\Delta\phi_w$, calculated by the dead-reckoning method, the set of data saved in the step 306 also contains the directional change $\Delta\phi_c$ determined by a compass sensor. In step 308 it is recorded, by incrementation of the counter i, that a set of data has been added to the series. Subsequently, in step 310 it is checked whether sufficient data has been collected to enable estimation of the parameters ratioL and ratioR. In the step 310 in FIG. 3 it is checked whether i has meanwhile become equal to N, N being the desired number of sets of data. In practice sometimes it is checked not only whether an adequate number of sets has been collected, but also whether the total distance travelled, corresponding to the sets, is sufficient. In a given embodiment a condition is imposed that at least 80 sets must have been collected and that the distance travelled during this period must amount to at least 100 meters. For as long as both conditions have not been satisfied, new sets of data are collected for subsequent sampling intervals in this embodiment, as denoted by the return to the step 204 in FIG. 3. When a sufficient number of sets have been collected at a given instant, they can be used to estimate the parameters ratioL and ratioR. In order to check the data, in step 312 it is checked whether the directional change has remained sufficiently small during the series of sampling intervals whereto the sets relate. In a practical example the directional change may amount to at the most 5 degrees. Finally, in step 314 the parameters ratioL and ratioR are estimated by applying the linear regression method to the collected sets of data.

For the estimation of the parameters, per sampling interval there are obtained data concerning the distance travelled, the directional change as determined by means of the wheel sensors and the directional change as determined by the compass sensor. This data is collected per interval as follows:

$$\Phi_{c,k} = \sum_{i=1}^{k} \Delta\Phi_{c,i}$$

$$\Phi_{p,k} = \sum_{i=1}^{k} \Delta\Phi_{p,i}$$

$$S_k = \sum_{i=1}^{k} \Delta S_i$$

Therein:

k is the interval to be processed; k runs from 1 to N, being the total number of intervals;

$\Delta\Phi_{c,i}$ is the directional change in the $i^{th}$ interval according to the compass sensor;

$\Delta\Phi_{p,i}$ is the directional change in the $i^{th}$ interval according to the wheel sensors; in order to enable easy translation of the estimated deviation into the parameters ratioL and ratioR, it is elected to determine $\Delta\phi_{p,i}$ directly from the pulses rather than to use the parameters ratioL and ratioR;

$\Delta s_i$ is the distance travelled in the $i^{th}$ interval.

These calculations are performed for each interval of an estimation cycle and the resultant set of data is processed.

This data is subject to the following equation:

$$\Phi_{c,k} - \Phi_{p,k} = \Phi_0 + E \times S_k + \Phi_{n,k} \quad (6)$$

Therein:

$\Phi_0$ is the direction of the vehicle at the beginning of the estimation cycle;

$\Phi_{n,k}$ is the noise term caused by inaccuracies in the measurements;

E is the error attributed to the parameters ratioL and ratioR.

On the basis of the N sets of data, the unknown parameters $\Phi_o$ and E of formula 6 are estimated by means of the linear regression method. The linear regression method is a known method for the statistical processing of measurement data and will not be elaborated herein. The parameter ratioL is calculated as follows from the E thus estimated:

$$E = \frac{2 \times \epsilon}{T}$$

and $$\text{ratioL}_{est} = 1 + \epsilon$$

The estimate of the parameters ratioL thus determined can be filtered via a low-pass filter before being used in the method for determining the directional change. This filtering operation prevents undesirably strong fluctuations in the values of the parameters. For one embodiment the following filtering operation is chosen:

$$\text{ratioL}_{new} = \text{ratioL} + P \times (\text{ratioL}_{est} - \text{ratioL})$$

Therein, the filter parameter P is determined in conformity with:

$$P = \frac{V}{V + \sigma^2}$$

where V is the variance of $\epsilon$ and $\sigma^2$ is the standard deviation of $\epsilon$, both calculated from the application of the linear regression method to the data collected. The value for ratioR$_{new}$ is determined from ratioL$_{new}$ in accordance with the formula:

$$\frac{1}{\text{ratioL}_{new}} + \frac{1}{\text{ratioR}_{new}} = 2$$

FIG. 3 is a simplified representation of the procedure. The various steps are represented so as to demonstrate the logic coherence and do not represent the sequential steps of a program which could be an implementation of the method. In an embodiment of a system for carrying out the method in accordance with the invention the steps 204, 206, 208 and 210 are incorporated in a given program module and the steps 304, 306, 308, 310, 312 and 314 in another program module, the modules cooperating in real time. Furthermore, for reasons of efficiency given steps may be partly combined. For example, in FIG. 3 a series is collected by the repeated execution of the step 306, and at a later stage in the step 314 parameters are estimated on the basis of this series by way of the linear regression method. However, it is alternatively possible to execute a step in the execution of the linear regression determination already whenever a new set becomes available. This saves space for the storage of the series and spreads the arithmetical effort required for the regression determination over a longer period of time.

If the vehicle moves in the forward direction at a reasonably constant speed, a similar method can be used to estimate a new value for the parameter dpp representing the distance travelled per pulse from the wheel sensor. To this end, the mean distance $\Delta s_{p,i}$ determined by means of the wheel sensors at a given number of successive instants i is saved. Subsequently, the distance travelled, cumulatively following therefrom, is linearly fit at the instants i for which the mean distance has been determined. A similar fit is made with determinations of the distance travelled which have been made independently, for example by way of the satellite positioning system GPS, at the various instants i. The slope of the relation thus fitted between the distance travelled and the time is the estimated speed. If the speed $V_p$ thus estimated by means of the wheel sensors deviates from the speed $V_g$ independently estimated (for example, by means of GPS), a new value can be estimated for the parameter dpp as follows:

$$\text{dpp}_{new} = \text{dpp} \; V_g/V_p$$

This new value can be used to replace dpp in a manner as described for ratioL and ratioR. Such substitution preferably takes place only if the vehicle drives straight forward over more than a predetermined minimum distance. The changes of dpp are often due to temporary causes, such as loading of the vehicle, ambient temperature etc. Therefore, it is advisable to save the newly determined dpp value only for one ride and, if necessary, for some time after the ride. It has been found that the parameter dpp may also be dependent on the speed of the vehicle. If necessary, a table can be composed with dpp values for use in determining the distance travelled at different speeds. The contents of this table can also be replaced in the above manner.

Systems for determining the position of a vehicle may comprise a data base with map data, for example data concerning roads, intersections and other objects. A system comprising such a data base can relate a position determined on the basis of dead-reckoning, to the map data, and thus find out on which road the vehicle moves. Because the direction of the road is known from the data base, the absolute direction of the vehicle can thus be determined. Such acquisition of data concerning the direction and directional changes of the vehicle represents an alternative for the use of the compass sensor. This technique is known per se and is described, for example in the cited U.S. Pat. No. 5,307,278 in which the technique is used to verify, and if necessary correct, a position calculated by dead-reckoning.

During use of the method in accordance with the invention, in which the parameters ratioL and ratioR used for dead-reckoning are estimated, data concerning the direction of the vehicle which are independent of the wheel sensors is required. The described technique of deriving such data from the map can also be used for the invention. If it is established, on the basis of the map in combination with position and direction of travel of the vehicle, that the vehicle can travel a road segment of predetermined minimum length, an estimation cycle is started. In the same way as in the method described with reference to FIG. 3, it may be desired that given conditions are satisfied during the acquisition of data. The criterion to be satisfied in order to terminate the acquisition and to calculate the parameters now consists in that the end of the road segment must have been reached. As soon as a calculated position is situated beyond the end of the road segment, taking into account the feasible inaccuracy of calculation, the criterion is deemed to have been satisfied. It can still be checked whether the collected data concerns a minimum distance travelled. The new values for the parameters are obtained by solution of the following set of equations:

$$ratioL_{est} \times \Sigma pL = ratioR_{est} \times \Sigma pR$$

$$\frac{1}{ratioL_{est}} + \frac{1}{ratioR_{est}} = 2$$

Therein, $ratioL_{est}$ and $ratioR_{est}$ are the new estimates and $\Sigma pL$ and $\Sigma pR$ are the pulses collected from the left wheel sensor and the right wheel sensor, respectively, for the relevant road segment. Before use in the calculations, the estimates thus obtained can be filtered via a low-pass filter. For a given embodiment the following filter equation is used:

$$ratioL_{new} = \frac{1}{\frac{1-W}{ratioL} + \frac{W}{ratioL_{est}}}$$

and for $ratioR_{new}$:

$$\frac{1}{ratioL_{new}} + \frac{1}{ratioR_{new}} = 2$$

Therein:

$$W = \mathrm{Min}\,(S/500,\ 0.25)$$

with:

$$S = \frac{dpp \times (ratioL \times \Sigma pL + ratioR\Sigma pr)}{2}$$

Two versions of the method in accordance with the invention have now been described. According to the first version, the directional data which is independent of the wheel sensors is obtained from a compass sensor. According to the second version, the data concerning the direction of the vehicle is derived from a data base with map data. The two versions can be used independently. In a given embodiment of a system utilizing the method of the invention, both versions are used. The system is conceived so that the two methods operate independently of one another and are capable of independently determining new values for the parameters ratioL and ratioR. The advantage of the combination of the two methods resides in their complementary nature. In given circumstances it is impossible to use one method because the relevant conditions are not satisfied, whereas the other method can be used. In a city there are often buildings, overpasses and other obstacles which interfere with the compass sensor to such an extent that its data cannot be used to estimate the parameters. In a city, however, the map data can be used very well for estimation, because there are many segments and the vehicle will often change direction, so that the position on the map is always accurately known. On highways the compass sensor will often not be disturbed so that it constitutes a suitable source of data on which the estimates can be based. Furthermore, it is possible to use the system in an environment for which no digital map data are available yet. The method utilizing the compass sensor, however, can then still continue to determine the new values for ratioL and ratioR.

Figure 4:
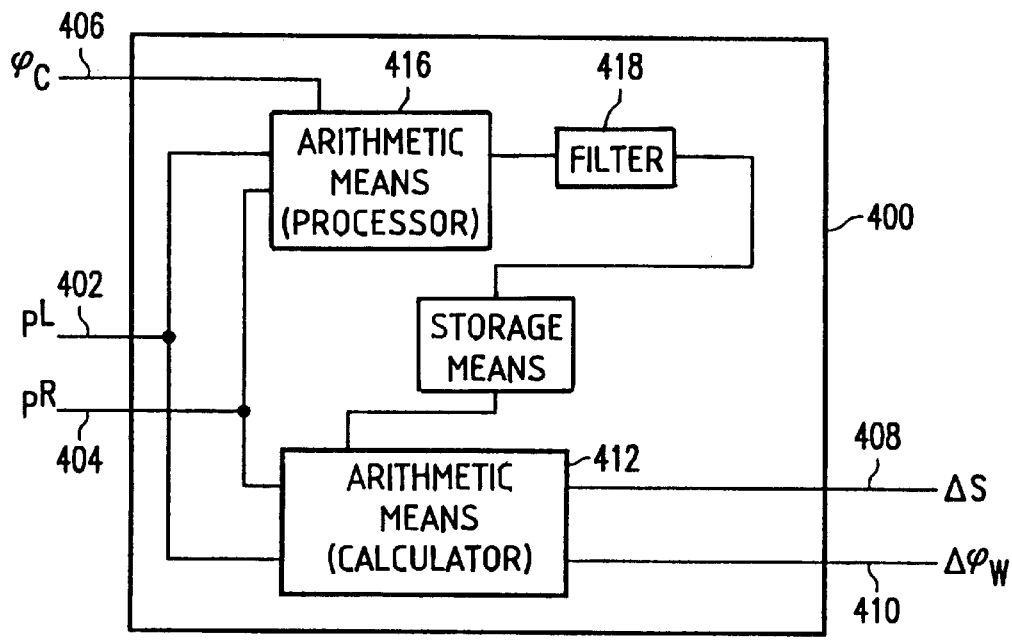
FIG. 4 shows diagrammatically an apparatus in accordance with the invention.

FIG. 4 is a diagrammatic representation of an apparatus 400 utilizing the method in accordance with the invention.

The Figure shows the elements which are relevant to the invention. This embodiment of the apparatus comprises inputs 402 and 404 for receiving pulses from the left wheel sensor and the right wheel sensor, respectively. The apparatus also comprises an input 406 for receiving a signal $\phi_c$ concerning the direction of the vehicle, which signal originates from a compass sensor. The apparatus furthermore comprises outputs 408 and 410 for supplying the calculated $\Delta s$ and $\Delta \phi_w$ respectively. The apparatus comprises arithmetic means 412 for calculating the formules:

$$dL = dpp \times pL \tag{1}$$

$$dR = dpp \times pR \tag{2}$$

$$\Delta s = \frac{ratioL \times dL + ratioR \times dR}{2} \tag{3}$$

$$\Delta \varphi_w = \frac{ratioL \times dL - ratioR \times dR}{T} \tag{4}$$

For calculating these formulae, the arithmetic means 412 utilize parameters ratioL, ratioR, dpp and T stored in storage means 414. The apparatus also comprises arithmetic means 416 capable of processing the signals pL, pR and $\phi_c$ for a number of sampling intervals, and of determining an estimate therefrom for the parameters ratioL and ratioR. In the embodiment shown, the estimates are filtered via a lowpass filter 418 after which they are stored in the storage means 414 for further use by the arithmetic means 412.

Figure 5A:
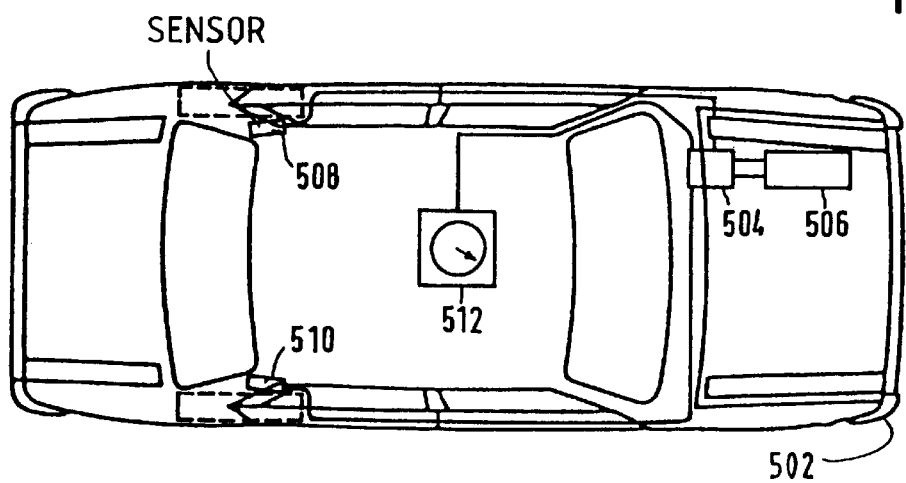
FIGS. 5A and 5B shows a vehicle in accordance with the invention.
Figure 5B:
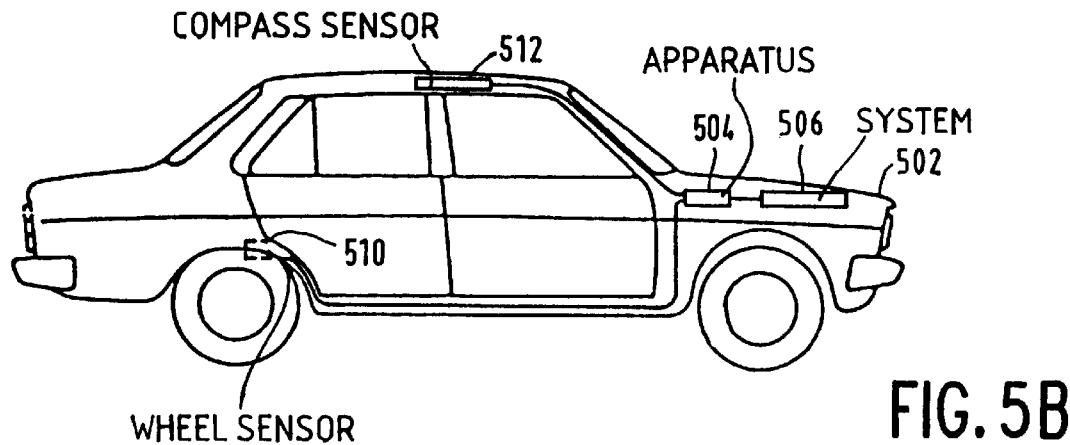

FIGS. 5A and 5B shows a vehicle 502 with an apparatus 504 in accordance with the invention, which apparatus cooperates with a system 506 in the vehicle. This system may be a navigation system which assists the driver en route from a starting point to a destination. The system advises the driver as regards roads and turn-offs to be taken, for which it should have the position of the vehicle available at any instant. The apparatus in accordance with the invention supplies the system with data relating to the distance travelled and directional changes, on the basis of which the position can be determined. The vehicle comprises a left wheel sensor 508 and a right wheel sensor 510 which are connected to the apparatus 504. The vehicle also comprises a compass sensor 512 which is connected to the apparatus. It is a characteristic aspect of the application of the apparatus in the vehicle that the data supplied by the apparatus is compensated for changing circumstances in which the vehicle operates. In the absence of such compensation, changes in the circumstances would cause deviations in the data supplied. Examples of such changes are the load of the vehicle and wear of the tyres.

What is claimed is:

1. A method of determining a directional change during navigation of a vehicle comprising a left wheel sensor and a right wheel sensor, each of said left and right wheel sensors being operative to supply pulses which are a measure of excursion of an associated wheel, said method comprising the steps:

recording a number of pulses pL from the left wheel sensor and a number of pulses pR from the right wheel sensor for a predetermined sampling interval;

supplying a left correction factor ratioL and a right correction factor ratioR;

determining a first directional change of said vehicle based at least in part on said left and right correction factors; and executing the above steps during operation of the vehicle for a given number of sampling intervals, determining a second directional change independently from said left and right wheel sensors during each sampling interval; and calculating a corrected left correction factor and a corrected right correction factor using the values for pL and pR and the independently determined second directional change as a function of statistical values derived from said first direction changes and said second directional changes said given number of sampling intervals, said corrected left correction factor and said corrected right correction factor being used in subsequent determinations of a directional change during navigation of said vehicle.

2. A method as claimed in claim 1, wherein said step of determining a second directional change independently from said left and right wheel sensors comprises using a compass sensor.

3. A method as claimed in claim 2, wherein the step of calculating a corrected left correction factor and a corrected right correction factor is only performed after said given number of sampling intervals and, moreover, only when a cumulative directional change, between a beginning and an end of said given number of sampling intervals, is below a given amount.

4. A method as claimed in claim 1, wherein said step of determining a second directional change independently from said left and right wheel sensors comprises using cartographic data.

5. A method as claimed in claim 4, wherein execution of the steps of the method is subject to the condition that, on the basis of the cartographic data, the vehicle will travel a minimum predetermined distance on a straight road segment, and subject to a number of conditions relating to a direction of travel of the vehicle and operation of the wheel sensors.

6. A method as claimed in claim 4, wherein said step of calculating a corrected left correction factor and a corrected right correction factor is only performed when the vehicle leaves a road segment and, moreover, when the collected values of pL and pR relate to a travelled road segment having at least a given minimum length.

7. A method as claimed in claim 1, wherein said method further comprises low-pass filtering said corrected left correction factor and said right correction factor, said low-pass filtered corrected left and right correction factors being used to subsequently determine the directional change.

8. A method of determining a directional change during navigation of a vehicle comprising a left wheel sensor and a right wheel sensor, each of said left and right wheel sensors being operative to supply pulses which are a measure of excursion of an associated wheel, said method comprising the steps:

recording a number of pulses pL from the left wheel sensor and a number of pulses pR from the right wheel sensor for a predetermined sampling interval;

supplying a left correction factor ratioL and a right correction factor ratioR;

determining a first directional change of said vehicle based at least in part on said left and right correction factors; and executing the above steps during operation of the vehicle for a given number of sampling intervals, determining a second directional change independently from said left and right wheel sensors during each sampling interval using a compass sensor;

calculating a corrected left correction factor and a corrected right correction factor using the values for pL and pR and the independently determined second directional change for said given number of sampling intervals, said corrected left correction factor and said corrected right correction factor being used in subsequent determinations of a directional change during navigation of said vehicle; and wherein execution of the steps of the method is interrupted if at least one condition out of a group of conditions, including speed of the vehicle, direction of travel of the vehicle, operation of the wheel sensors and operation of the compass sensor is not satisfied.

9. An apparatus comprising:

a left input for receiving a signal pL representative of number of left pulses;

right input for receiving a signal pR which is representative of the number of right pulses;

storage means for storing a left correction factor ratioL and a right correction factor ratioR; and arithmetic means coupled to the left input, the right input and the storage means for calculating (ratioL×pL−ratioR×pR), wherein the apparatus further comprises:

means for receiving information, independently of said left and said right inputs, relating to a series of directional changes; and means for associating the series of directional changes with a respective series of left pulses and right pulses for calculating a corrected left correction factor and a corrected right correction factor.

10. An apparatus as claimed in claim 9, means for low-pass said corrected left correction factor and said corrected right correction factor, respectively.

11. A vehicle comprising:

a left side and a right side wheel; and a system for indicating a directional change for said vehicle, said system including:

a left side wheel sensor for generating pulses during movement of said vehicle corresponding to a wheel excursion of said left side wheel;

a right side wheel sensor for generating pulses during movement of said vehicle corresponding to a wheel excursion of said right side wheel;

first storing means for storing a left correction factor ratioL and a right correction factor ratioR;

recording means, coupled to said left and right wheel sensors, for recording, during a sampling interval a number of pulses, pL from said left side wheel sensor and a number of pulses pL from said right wheel sensor;

multiplying means for multiplying the left correction factor ratioL stored in said first storing means by the number of pulses pL recorded in said recording means, and for multiplying the right correction factor ratioR stored in said first storing means by the number of pulses pR recorded in said recorded means;

means for calculating the difference between the two multiplied quantities, said difference being equal to the direction change of said vehicle;

means for determining a second direction change quantity independently of said right and left side wheel sensors;

second storing means for storing numbers of pulses from said left wheel sensor and numbers of pulses from said right wheel sensor for a given number of sampling intervals;

third storing means for storing second direction change quantities for said given number of sampling intervals;

estimating means for estimating a corrected right correction factor ratioR and a corrected left correction factor ratioL based on statistical values derived from said numbers of pulses from said left wheel sensor and said numbers of pulses from said right wheel sensor stored in said second storing means, and on said second direction change quantities stored in said third storing means; and means for storing said corrected left correction factor and said corrected right correction factor in said first storing means.

12. A method of determining a distance travelled during navigation of a vehicle comprising a left wheel sensor and a right wheel sensor, each of said left and right wheel sensors being operative to supply pulses which are a measure of excursion of an associated wheel, said method comprising the steps:

recording a number of pulses pL from the left wheel sensor and a number of pulses pR from the right wheel sensor, for a given sampling interval; and calculating a first distance Δs travelled from $$\Delta s = dpp \times (pL + pR)/2,$$

where dpp is a correction factor;

wherein the method also comprises:

determining a second distance travelled independent of said left and right wheel sensors;

executing the above steps during operation of the vehicle and for a given number of sampling intervals, while storing for each sampling interval values of said first and said second distance travelled; and calculating a value for dpp by comparison of the values collected for Δs and the independently determined distance travelled.

13. A method of determining a directional change for a vehicle, said method comprising the steps:

recording during a sampling interval, a number of pulses pL from a left side wheel sensor, and a number of pulses pL from a right side wheel sensor during movement of said vehicle, said number of pulses corresponding to respective wheel excursions;

calculating, during said sampling interval, a first direction change quantity by multiplying said number of pulses pL by a stored left correction factor thereby forming a first product, multiplying said number of pulses pR by a stored right correction factor thereby forming a second product, and subtracting the second product from the first product;

determining, during said sampling interval, a second direction change quantity independently of said right and left side wheel sensors;

repeating the above steps for a given number of sampling intervals while storing said first and second direction change quantities for each sampling interval;

calculating a corrected right correction factor and a corrected left correction factor using said stored first and second direction change quantities for said given number of sampling intervals; and storing said corrected left and right correction factors for a subsequent determination of a directional change for the vehicle.

14. The method as claimed in claim 13, wherein the given number of sampling intervals is about 80.

15. A system for indicating a directional change for a vehicle having a left and a right side wheel, said system comprising:

a left side wheel sensor for generating pulses during movement of said vehicle corresponding to a wheel excursion of said left side wheel;

a right side wheel sensor for generating pulses during movement of said vehicle corresponding to a wheel excursion of said right side wheel;

recording means, coupled to said left and right wheel sensors, for recording, during a sampling interval, the number of pulses pL from said left side wheel sensor and the number of pulses pL from said right side wheel sensor;

means for determining a direction change quantity independently of said right and left side wheel sensors;

estimating means for estimating a right correction factor ratioR and a left correction factor ratioL based on said independently determined direction change quantity;

storing means for storing said estimated left correction factor and said estimated right correction factor;

multiplying means for multiplying the estimated left correction factor ratioL by the number of pulses pL recorded in said recording means and multiplying the estimated right correction factor ratioR by the number of pulses pR recorded in said recorded means;

means for calculating the difference between the two multiplied quantities, said difference being equal to the direction change of said vehicle.

16. An apparatus for determining a directional change during navigation of a vehicle, the apparatus comprising:

a left wheel sensor, a right wheel sensor, each of said left and right wheel sensors being operative to supply pulses which are a measure of excursion of an associated wheel;

a memory recording a number of pulses pL from the left wheel sensor and a number of pulses pR from the right wheel sensor for a predetermined sampling interval;

a means for supplying a left correction factor ratioL and a right correction factor ratioR, wherein a first directional change of said vehicle is determined based at least in part on said left and right correction factors, and executes the above steps during operation of the vehicle for a given number of sampling intervals, a means for determining a second directional change independently from said left and right wheel sensors during each sampling interval using a compass sensor and calculating a corrected left correction factor and a corrected right correction factor using the values for pL and pR and the independently determined second directional change for said given number of sampling intervals, said corrected left correction factor and said corrected right correction factor being used in subsequent determinations of a directional change during navigation of said vehicle; and an interruption means for interrupting determinations made if at least one condition out of a group of conditions, including speed of the vehicle, direction of travel of the vehicle, operation of the wheel sensors and operation of the compass sensor is not satisfied.

* * * * *